US009765470B1

(12) United States Patent
Dufresne

(10) Patent No.: US 9,765,470 B1
(45) Date of Patent: Sep. 19, 2017

(54) CLOTHES DRYING RACK

(71) Applicant: Marie Dufresne, La Salle (CA)

(72) Inventor: Marie Dufresne, La Salle (CA)

( * ) Notice: Subject to any disclaimer, the term of this patent is extended or adjusted under 35 U.S.C. 154(b) by 0 days.

(21) Appl. No.: 14/982,174

(22) Filed: Dec. 29, 2015

(51) Int. Cl.
*A47B 43/00* (2006.01)
*A47B 47/00* (2006.01)
*A47B 57/00* (2006.01)
*D06F 57/10* (2006.01)
*D06F 57/06* (2006.01)
*D06F 57/08* (2006.01)
*A47F 5/10* (2006.01)
*F16M 11/38* (2006.01)

(52) U.S. Cl.
CPC .............. *D06F 57/10* (2013.01); *A47B 43/00* (2013.01); *A47F 5/10* (2013.01); *D06F 57/06* (2013.01); *D06F 57/08* (2013.01); *F16M 11/38* (2013.01)

(58) Field of Classification Search
CPC .......... D06F 57/10; D06F 57/06; D06F 57/08; D06F 57/00; D06F 1/12; D06F 95/002; A47K 10/00; A47K 10/06; A47B 43/00; A47B 61/003; A47B 3/02; A47F 3/004; A47F 5/10; F16M 11/38; A47G 25/0664
USPC ..... 211/85.24, 197, 195, 200, 202; 248/164, 248/431; 108/118; D6/675.1
See application file for complete search history.

(56) References Cited

U.S. PATENT DOCUMENTS

| | | | | |
|---|---|---|---|---|
| 155,952 A * | 10/1874 | Jaquith | ................... | D06F 57/10 211/202 |
| 264,751 A * | 9/1882 | Potts | ................... | G09F 15/0068 211/202 |
| 404,636 A * | 6/1889 | Levy | ...................... | A47G 25/10 190/17 |
| 409,642 A * | 8/1889 | Little | ...................... | D06F 57/10 211/134 |
| 474,950 A * | 5/1892 | Dodd | ........................ | A47F 5/13 190/17 |
| 487,429 A * | 12/1892 | Ruede | ..................... | D06F 57/08 211/195 |
| 647,299 A * | 4/1900 | Gates | ...................... | D06F 57/10 211/202 |
| 710,790 A * | 10/1902 | Magerhans | ............ | A47G 25/12 211/200 |
| 844,962 A * | 2/1907 | Sherlock | ................. | D06F 57/08 211/195 |
| 872,235 A * | 11/1907 | Himmel | .................. | D06F 57/10 190/17 |
| 1,051,766 A * | 1/1913 | Rogers | .................... | D06F 57/10 211/202 |
| 1,073,531 A * | 9/1913 | Schneider | ............... | D06F 57/08 211/203 |
| 1,533,470 A * | 4/1925 | Schmitt | ................... | D06F 57/10 211/202 |

(Continued)

FOREIGN PATENT DOCUMENTS

WO WO2004109007 A1 12/2004

*Primary Examiner* — Jennifer E Novosad

(57) ABSTRACT

The clothes drying rack is a collapsible rack adapted for use in drying apparel and textiles. The clothes drying rack has a reinforced top structure and bottom structure to support heavy loads. The top structure further comprises a plurality of clothes hooks to further enhance the capacity of the clothes drying rack. When not in use, the clothes drying rack can be collapsed into a smaller form factor for storage. The clothes drying rack comprises a top structure, a bottom structure, and a plurality of scissor structures.

3 Claims, 6 Drawing Sheets

(56) References Cited

U.S. PATENT DOCUMENTS

| | | | |
|---|---|---|---|
| 1,594,415 A * | 8/1926 | Kalgren | D06F 57/10 16/365 |
| 2,388,637 A * | 11/1945 | John | D06F 57/10 211/123 |
| 2,445,403 A * | 7/1948 | Mayerman | D06F 58/14 211/202 |
| 3,133,645 A * | 5/1964 | Cecil | D06F 57/10 211/202 |
| 4,131,205 A * | 12/1978 | Malecki | D06F 57/10 211/200 |
| 4,297,795 A * | 11/1981 | Licari | D06F 57/10 211/198 |
| 4,630,312 A | 12/1986 | Milstein | |
| 4,828,123 A * | 5/1989 | Basore | D06F 57/10 211/202 |
| D322,698 S | 12/1991 | Cassel | |
| 5,213,221 A * | 5/1993 | Raye, Sr. | D06F 57/08 211/181.1 |
| D341,687 S * | 11/1993 | Park | D34/5 |
| 6,394,292 B1 * | 5/2002 | Sabounjian | D06F 57/10 211/182 |
| 6,427,858 B2 * | 8/2002 | Sabounjian | D06F 57/08 211/183 |
| 6,932,227 B1 * | 8/2005 | Glenn | D06F 57/08 211/202 |
| 7,172,081 B2 * | 2/2007 | Trowsdale | D06F 57/10 211/200 |
| 7,597,205 B2 * | 10/2009 | Shepard-Vagedes | A47B 61/06 211/189 |
| 8,286,810 B2 * | 10/2012 | Sabounjian | D06F 57/10 211/200 |
| D707,472 S * | 6/2014 | Wehner | D6/675.1 |
| D708,873 S * | 7/2014 | Wehner | A47B 43/00 D6/675.2 |
| D732,247 S * | 6/2015 | Reid | D30/121 |
| 2004/0074858 A1 * | 4/2004 | Thuma | D06F 57/10 211/202 |
| 2004/0173553 A1 * | 9/2004 | Li | D06F 57/10 211/202 |
| 2007/0138119 A1 * | 6/2007 | Schwerdlin | D06F 57/10 211/202 |
| 2007/0221598 A1 * | 9/2007 | Sabounjian | D06F 57/06 211/200 |
| 2009/0178987 A1 * | 7/2009 | Trowsdale | D06F 57/08 211/85.3 |

* cited by examiner

CLOTHES DRYING RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of foldable and telescopic garment hangers, more specifically, a foldable clothes drying rack.

SUMMARY OF INVENTION

The clothes drying rack is a collapsible rack adapted for use in drying apparel and textiles. The clothes drying rack has a reinforced top structure and bottom structure to support heavy loads. The top structure further comprises a plurality of clothes hooks to further enhance the capacity of the clothes drying rack. When not in use, the clothes drying rack can be collapsed into a smaller form factor for storage.

These together with additional objects, features and advantages of the clothes drying rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the clothes drying rack in detail, it is to be understood that the clothes drying rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clothes drying rack.

It is therefore important that the claims be regarded as including such equivalent construction insofar as they do not depart from the spirit and scope of the clothes drying rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
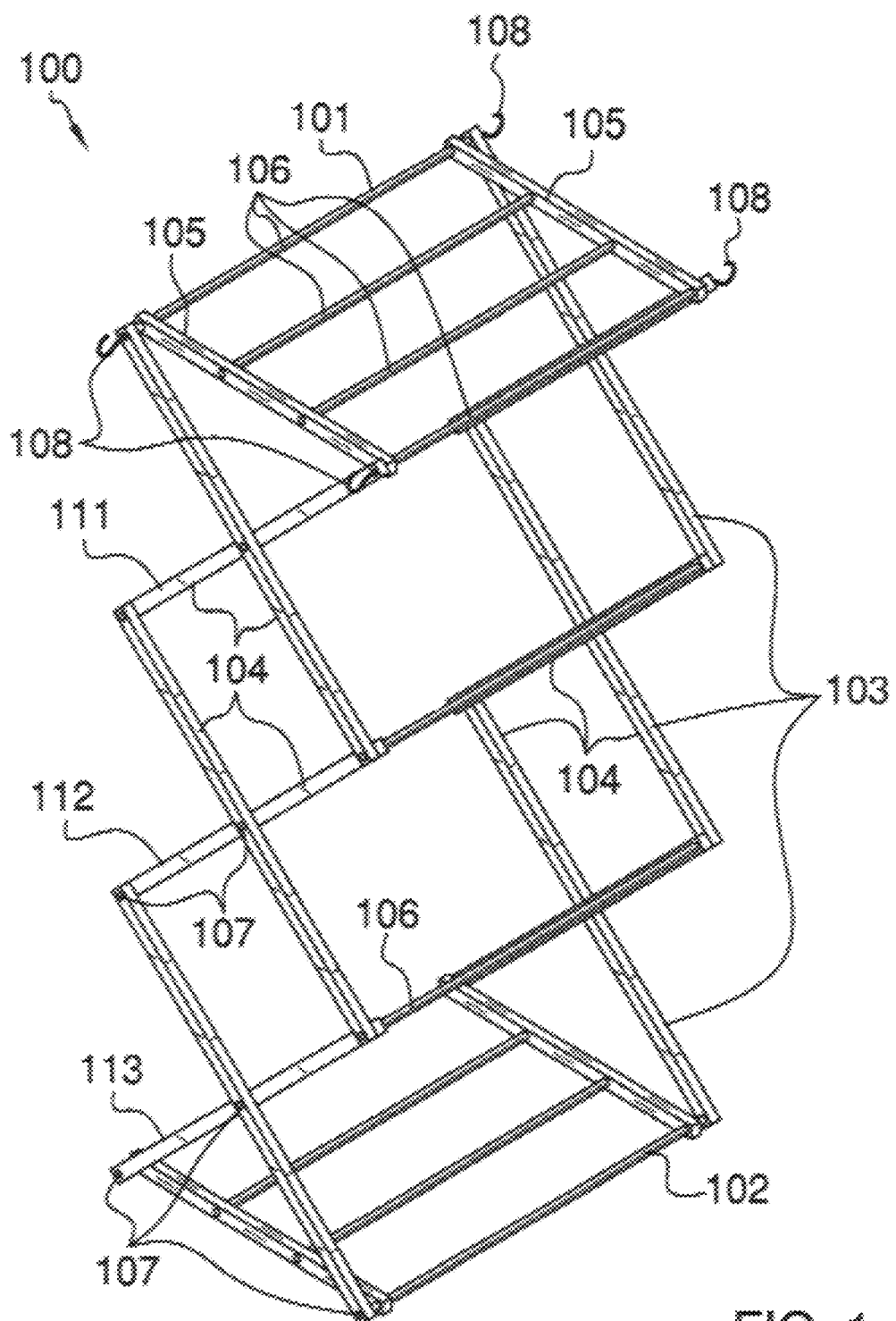
FIG. 1 is a perspective view of an embodiment of the disclosure.
Figure 2:
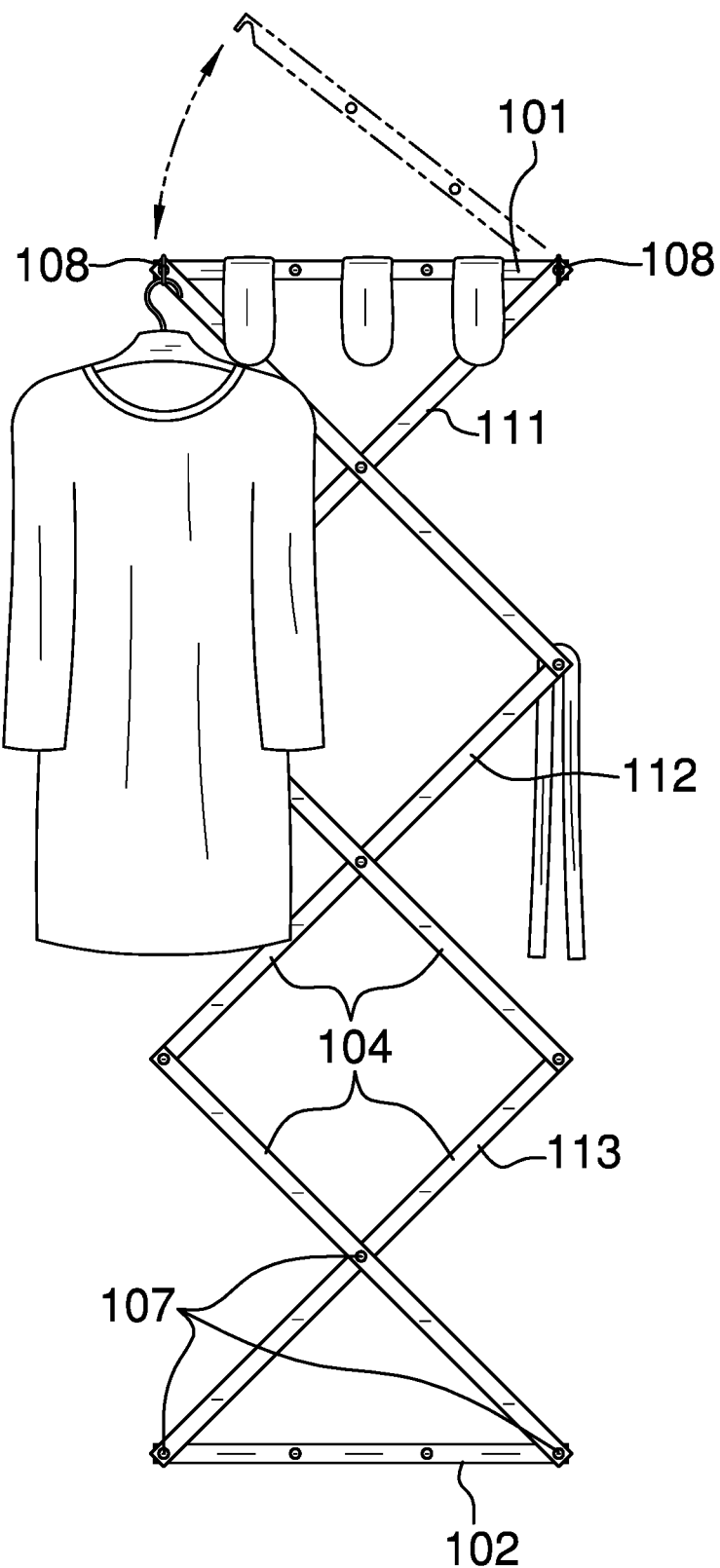
FIG. 2 is a side view of an embodiment of the disclosure.
Figure 3:
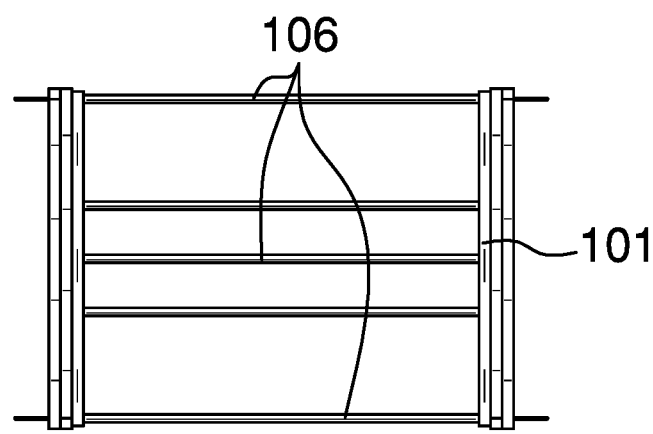
FIG. 3 is a top view of an embodiment of the disclosure.
Figure 4:
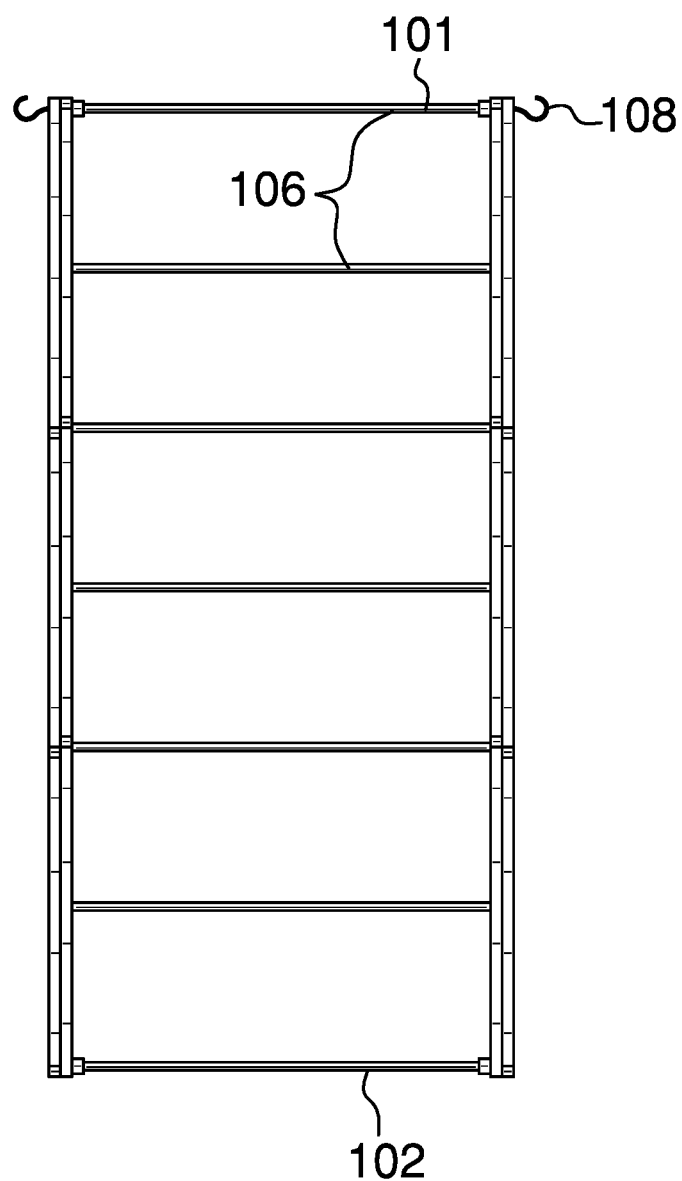
FIG. 4 is a front view of a folded embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7.

The clothes drying rack 100 (hereinafter invention) comprises a top structure 101, a bottom structure 102, and a plurality of scissor structures 103. The top structure 101, the bottom structure 102, and the plurality of scissor structures 103 are assembled from a plurality of scissor bars 104, a plurality of end caps 105, a plurality of dowels 106, and a plurality of pivots 107. The invention 100 further comprises a plurality of clothes hooks 108 and a plurality of locking hooks 109. In the first potential embodiment of the disclosure, the plurality of scissor structures 103 further comprises a first scissor structure 111, a second scissor structure 112, and a third scissor structure 113.

Each of the plurality of scissor bars 104 is a strut that is formed in the shape of a rectangular block or bar. In the first potential embodiment of the disclosure, the plurality of scissor bars 104 further comprises a first scissor bar 131, a second scissor bar 132, a third scissor bar 133, a fourth scissor bar 134, a fifth scissor bar 135, a sixth scissor bar 136, a seventh scissor bar 137, an eighth scissor bar 138, a ninth scissor bar 139, a tenth scissor bar 140, an eleventh scissor bar 141, and a twelfth scissor bar 142. Each of the plurality of end caps 105 is a strut that is formed in the shape of a rectangular block or bar. In the first potential embodiment of the disclosure, the plurality of end caps 105 further comprises a first end bar 121, a second end bar 122, a third end bar 123 and a fourth end bar 124. Each of the plurality of dowels 106 is a cylindrical bar. In the first potential embodiment of the disclosure, the plurality of dowels 106 further comprises a first dowel 151, a second dowel 152, a third dowel 153, a fourth dowel 154, a fifth dowel 155, a sixth dowel 156 a seventh dowel 157, an eighth dowel 158, a ninth dowel 159, a tenth dowel 160, an eleventh dowel 161, a twelfth dowel 162, and a thirteenth dowel 163.

Figure 7:
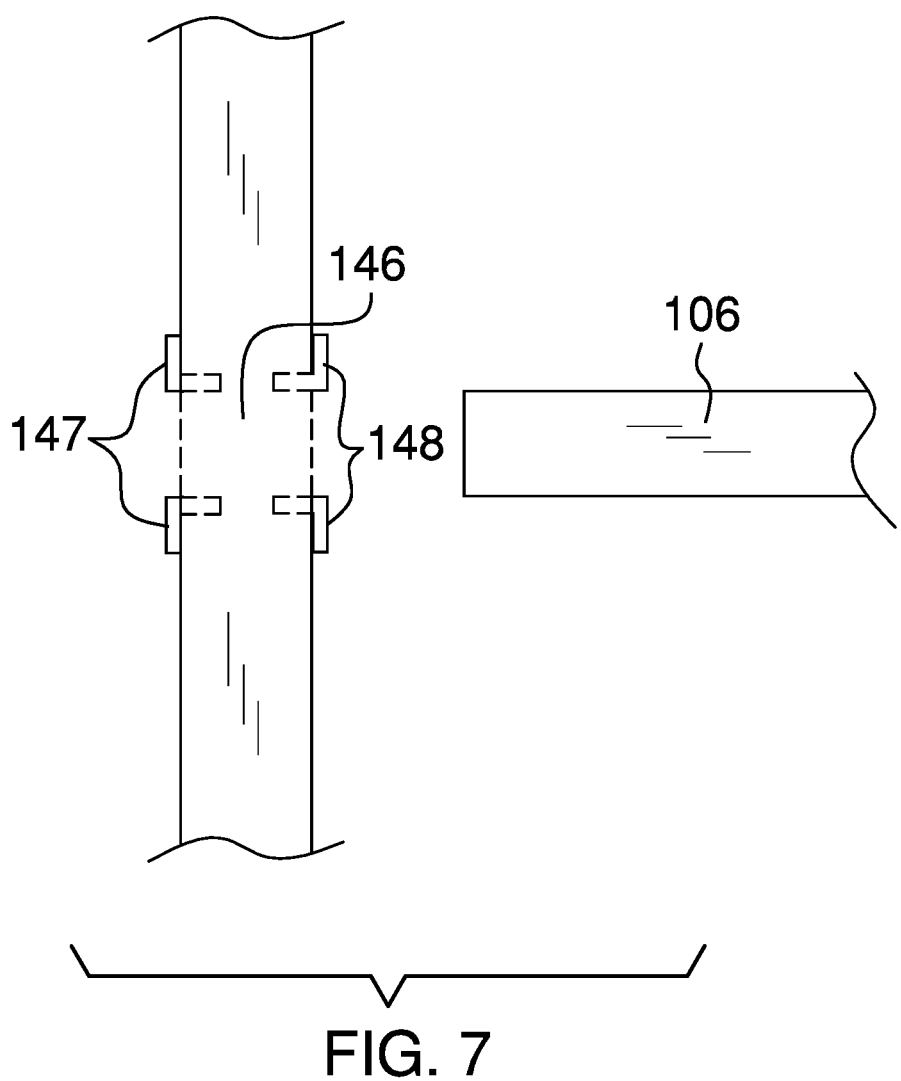
FIG. 7 is a detail view of an embodiment of the disclosure.

Each of the plurality of pivots 107 performs two functions. First, each pivot selected from the plurality of pivots 107 is used to attach a dowel selected from the plurality of dowels 106 to either a scissor bar selected from the plurality of scissor bars 104 or an end cap selected from the plurality of end caps 105. Second, each pivot selected from the plurality of pivots 107 allows a scissor bar selected from the plurality of scissor bars 104 or an end cap selected from the plurality of end caps 105 to rotate around the dowel attached by the selected pivot. As shown in FIG. 7, each of the plurality of pivots 107 further comprises a drilled hole 146, a first grommet 147 and a second grommet 148. The drilled hole 146 is a hole that is drilled into either a scissor bar selected from the plurality of scissor bars 104 or an end cap selected from the plurality of end caps 105 that is sized to receive a dowel selected from the plurality of dowels 106. The first grommet 147 and the second grommet 148 are used to cap the edges of the drilled hole 146. The first grommet 147 and the second grommet 148 are sized to receive the dowel selected from the plurality of dowels 106.

The plurality of pivots 107 further comprises a first pivot 171, a second pivot 172, a third pivot 173, a fourth pivot 174, a fifth pivot 175, a sixth pivot 176, a seventh pivot 177, an eighth pivot 178, a ninth pivot 179, a tenth pivot 180, an eleventh pivot 181, a twelfth pivot 182, a thirteenth pivot 183, a fourteenth pivot 184, a fifteenth pivot 185, a sixteenth pivot 186, a seventeenth pivot 187, an eighteenth pivot 188, a nineteenth pivot 189, a twentieth pivot 190, a twenty first pivot 191, a twenty second pivot 192, a twenty third pivot 193, a twenty fourth pivot 194, a twenty fifth pivot 195, a twenty sixth pivot 196, a twenty seventh pivot 197, a twenty eighth pivot 198, a twenty ninth pivot 199, a thirtieth pivot 200, a thirty first pivot 201, a thirty second pivot 202, a thirty third pivot 203, a thirty fourth pivot 204, a thirty fifth pivot 205, a thirty sixth pivot 206, a thirty seventh pivot 207, a thirty eighth pivot 208, a thirty ninth pivot 209, a fortieth pivot 210, a fourth first pivot 211, a forty second pivot 212, a forty third pivot 213, a forty fourth pivot 214, a forty fifth pivot 215, a forty sixth pivot 216, a forty seventh pivot 217 and a forty eighth pivot 218.

The top structure 101 is assembled from the first end cap 121, the second end cap 122, the first dowel 151, the second dowel 152, the third dowel 153, the fourth dowel 154, the first pivot 171, the second pivot 172, the third pivot 173, the fourth pivot 174, the fifth pivot 175, the sixth pivot 176, the seventh pivot 177, and the eighth pivot 178. The first pivot 171, the third pivot 173, the fifth pivot 175 and the seventh pivot 177 are installed in the first end cap 121. The second pivot 172, the fourth pivot 174, the sixth pivot 176 and the eighth pivot 178 are installed in the second end cap 122. The first dowel 151 attaches the first pivot 171 to the second pivot 172. The second dowel 152 attaches the third pivot 173 to the fourth pivot 174. The third dowel 153 attaches the fifth pivot 175 to the sixth pivot 176. The fourth dowel 154 attaches the seventh pivot 177 to the eighth pivot 178.

The bottom structure 102 is assembled in a manner identical to the top structure 101 as described in the previous paragraph. The bottom structure 102 further comprises the third end cap 123, the fourth end cap 124, the tenth dowel 160, the eleventh dowel 161, the twelfth dowel 162, the thirteenth dowel 163, the twenty ninth pivot 199, the thirtieth pivot 200, the thirty first pivot 201, the thirty second pivot 202, the thirty third pivot 203, the thirty fourth pivot 204, the thirty fifth pivot 205 and the thirty sixth pivot 206. The twenty ninth pivot 199, the thirty first pivot 201, the thirty third pivot 203 and the thirty fifth pivot 205 are installed in the third end cap 123. The thirtieth pivot 200, the thirty second pivot 202, the thirty fourth pivot 204 and the thirty sixth pivot 206 are installed in the fourth end cap 124. The tenth dowel 160 attaches the twenty ninth pivot 199 and the thirtieth pivot 200. The eleventh dowel 161 attaches the thirty first pivot 201 and the thirty second pivot 202. The twelfth dowel 162 attaches the thirty third pivot 203 and the thirty fourth pivot 204. The thirteenth dowel 163 attaches the thirty fifth pivot 205 and the thirty sixth pivot 206.

The top structure 101 further comprises a plurality of clothes hooks 108. Each of the plurality of clothes hooks 108 is a commercially available hook that is installed in either the first end cap 121 or the second end cap 122 for the purpose of holding apparel or textiles. In the first potential embodiment of the disclosure, the plurality of clothes hooks 108 comprises a first clothes hook 115, a second clothes hook 116, a third clothes hook 117, and a fourth clothes hook 118. The first clothes hook 115 and the second clothes hook 116 are installed in the second end cap 122. The third clothes hook 117 and the fourth clothes hook 118 are installed in the first end cap 121.

The first scissor structure 111 further comprises the first scissor bar 131, the second scissor bar 132, the third scissor bar 133, the fourth scissor bar 134, the fifth dowel 155, the sixth dowel 156, the ninth pivot 179, the tenth pivot 180, the eleventh pivot 181, the twelfth pivot 182, the thirteenth pivot 183, the fourteenth pivot 184, the fifteenth pivot 185 and the sixteenth pivot 186. The ninth pivot 179 and the thirteenth pivot 183 are installed in the first scissor bar 131. The tenth pivot 180 and the fourteenth pivot 184 are installed in the second scissor bar 132. The eleventh pivot 181 and the fifteenth pivot 185 are installed in the third scissor bar 133. The twelfth pivot 182 and the sixteenth pivot 186 are installed in the fourth scissor bar 134. The fifth dowel 155 attaches the ninth pivot 179, tenth pivot 180, eleventh pivot 181, and twelfth pivot 182 to each other. The sixth dowel 156 attaches the thirteenth pivot 183, fourteenth pivot 184, fifteenth pivot 185, and sixteenth pivot 186 to each other.

The first scissor structure 111 further comprises a plurality of locking hooks 109. The plurality of locking hooks 109 further comprises a first locking hook 126 and a second locking hook 127. Each of the plurality of locking hooks 109 are commercially available hooks that are used to attach the first scissor structure 111 to the fourth dowel 154 of the top structure 101. When the plurality of locking hooks 109 are attached to the fourth dowel 154, the invention 100 is locked in position.

Figure 5:
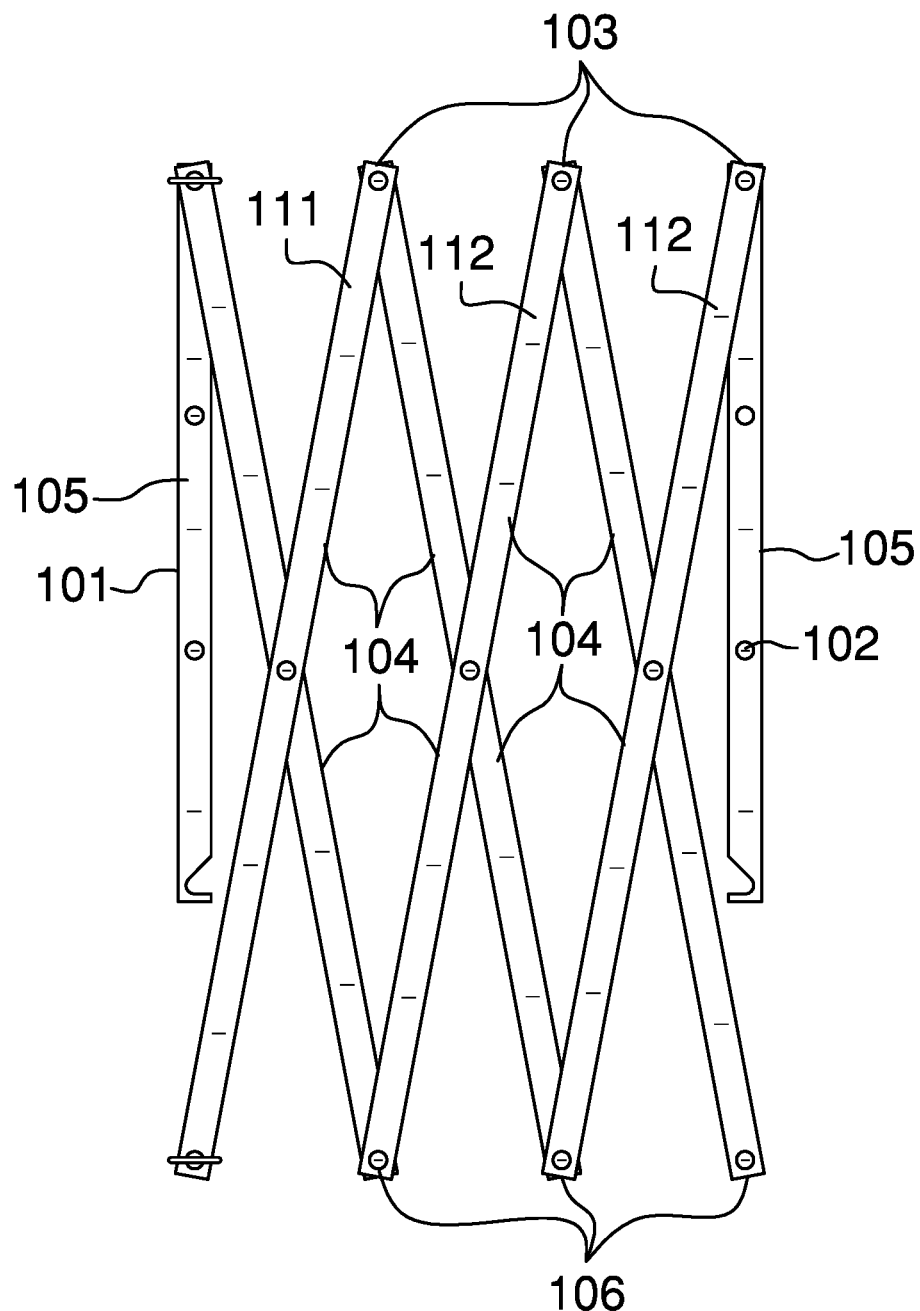
FIG. 5 is a side view of an embodiment of the disclosure.
Figure 6:
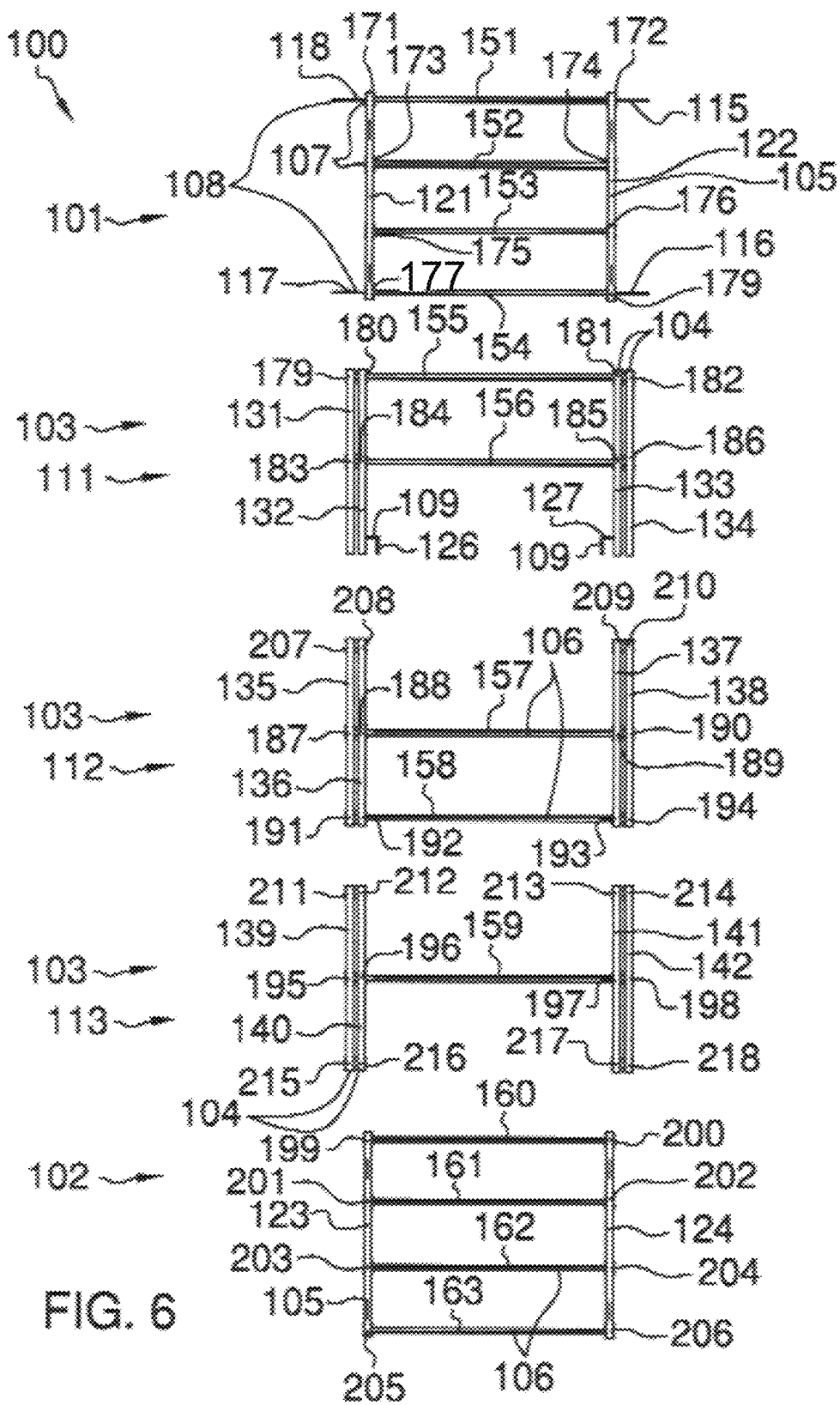
FIG. 6 is an exploded view of an embodiment of the disclosure.

As shown in FIG. 5, when the plurality of locking hooks is released from the fourth dowel 154, the first scissor structure 111 will collapse such that the first scissor bar 131 and the fourth scissor bar 134 will rotate in the same direction and the second scissor bar 132 and the third scissor bar 133 will rotate in the same direction which is opposite to the direction of rotation of the first scissor bar 131 and the fourth scissor bar 134 reducing the overall height of the first scissor structure 111.

The second scissor structure 112 further comprises the fifth scissor bar 135, sixth scissor bar 136, the seventh scissor bar 137, the eighth scissor bar 138, the seventh dowel 157, the eighth dowel 158, the seventeenth pivot 187, the eighteenth pivot 188, the nineteenth pivot 189, the twentieth pivot 190, the twenty first pivot 191, the twenty second pivot 192, the twenty third pivot 193, the twenty fourth pivot 194, the thirty seventh pivot 207, the thirty eighth pivot 208, the thirty ninth pivot 209 and the fortieth pivot 210. The seventeenth pivot 187, the twenty first pivot 191 and the thirty seventh pivot 207 are installed in the fifth scissor bar 135. The eighteenth pivot 188, the twenty second pivot 192 and the thirty eighth pivot 208 are installed in the sixth scissor bar 136. The nineteenth pivot 189, the twenty third pivot 193, and the thirty ninth pivot 209 are installed in the seventh scissor bar 137. The twentieth pivot 190, the twenty fourth pivot 194, and the fortieth pivot 210 are installed in the eighth scissor bar 138. The seventh dowel 157 attaches the seventeenth pivot 187, eighteenth pivot 188, nineteenth pivot 189, and twentieth pivot 190 to each other. The eighth dowel 158 attaches the twenty first pivot 191, twenty second pivot 192, twenty third pivot 193, and twenty fourth pivot 194 to each other.

The fifth dowel 155 attaches the thirty seventh pivot 207, thirty eighth pivot 208, the thirty ninth pivot 209 and fortieth pivot 210 to each other and to the first scissor structure 111. As shown in FIG. 5, when the first scissor structure 111 is collapsed, the second scissor structure 112 will collapse such that the fifth scissor bar 135 and the eighth scissor bar 138 will rotate in the same direction and the sixth scissor 136 and the seventh scissor bar 137 will rotate in the same direction which is opposite to the direction of rotation of the fifth scissor bar 135 and the eighth scissor bar 138 reducing the overall height of the second scissor structure 112.

The third scissor structure 113 further comprises the ninth scissor bar 139, tenth scissor bar 140, the eleventh scissor bar 141, the twelfth scissor bar 142, the ninth dowel 159, the twenty fifth pivot 195, the twenty sixth pivot 196, the twenty seventh pivot 197, the twenty eighth pivot 198, the forty first pivot 211, the forty second pivot 212, the forty third pivot 213, the forty fourth pivot 214, the forty fifth pivot 215, the forty sixth pivot 216, the forty seventh pivot 217 and the forty eighth pivot 218. The twenty fifth pivot 195, the forty first pivot 211 and the forty fifth pivot 215 are installed in the ninth scissor bar 139. The twenty sixth pivot 196, the forty second pivot 212 and the forty sixth pivot 216 are installed in the tenth scissor bar 140. The twenty seventh pivot 197, the forty third pivot 213, and the forty seventh pivot 217 are installed in the eleventh scissor bar 141. The twenty eighth pivot 198, the forty fourth pivot 214, and the forty eighth pivot 218 are installed in the twelfth scissor bar 142. The ninth dowel 159 attaches the twenty fifth pivot 195, twenty sixth pivot 196, twenty seventh pivot 197 and the twenty eighth pivot 198 to each other. The eighth dowel 158 attaches the forty fifth pivot 215, forty sixth pivot 216, forty seventh pivot 217 and forty eighth pivot 218 to each other and to the second scissor structure 112. The tenth dowel 160 attaches the forty first pivot 211, forty second pivot 212, forty third pivot 213 and forty fourth pivot 214 to each other and to the bottom structure 102. As shown in FIG. 5, when the second scissor structure 112 is collapsed, the third scissor structure 113 will collapse such that the ninth scissor bar 139 and the twelfth scissor bar 142 will rotate in the same direction and the sixth scissor 136 and the eleventh scissor bar 141 will rotate in the same direction which is opposite to the direction of rotation of the ninth scissor bar 139 and the twelfth scissor bar 142 reducing the overall height of the third scissor structure 113.

To use the invention 100, the first scissor structure 111, second scissor structure 112, and the third scissor structure 113 are raised such that first scissor structure 111 is attached to the top structure 101 using the first locking hook 126 and the second locking hook 127 such that the invention 100 is in an expanded embodiment which allows apparel and textiles to be stored on the invention 100.

Each of the plurality of scissor bars 104 and each of the plurality of end caps 105 is a commercially available piece of lumber formed in the shape of a rectangular block. Each of the plurality of dowels 106 is a commercially available wooden dowel. Each of the plurality of pivots 107 comprises two commercially available metal grommets that are used to cap holes drilled in the plurality of scissor bars 104 and the plurality of end caps 105. The metal grommets and the holes drilled in the plurality of scissor bars 104 and the plurality of end caps 105 are sized to receive each of the plurality of dowels 106. Each of the plurality of clothes hooks 108 and each of the plurality of locking hooks 109 are readily and commercially available hardware. The top structure 101 and the bottom structure 102 are reinforced for heavy loads through the use of four dowels instead of two or three dowels. The use of the additional dowels in the top structure and the bottom structure improve the stability and load carrying capacity of the invention 100.

The following definitions were used in this disclosure:

Pivot: As used in this disclosure, a pivot is a rod or shaft around which an object rotates or swings.

Textile: As used in this disclosure, a textile is a material that is woven, knitted, or felted. Synonyms in common usage for this definition include fabric and cloth.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A garment hanger comprising:
   a top structure, a bottom structure; and a plurality of scissor structures;
   wherein the garment hanger is adapted for use in drying apparel and textiles;
   wherein the top structure and bottom structure are reinforced via the plurality of scissor structures in order to support loads thereon;
   wherein the garment hanger further comprises a plurality of clothes hooks;
   wherein the garment hanger is able to be collapsed;
   wherein the top structure, the bottom structure, and the plurality of scissor structures are assembled from a plurality of scissor bars, a plurality of end caps, a plurality of dowels, and a plurality of pivots;
   wherein the plurality of scissor structures further comprises a first scissor structure, a second structure scissor, and a third scissor structure;
   wherein each of the plurality of scissor bars is a strut;
   wherein the plurality of scissor bars further comprises a first scissor bar, a second scissor bar, a third scissor bar, a fourth scissor bar, a fifth scissor bar, a sixth scissor bar, a seventh scissor bar, an eighth scissor bar, a ninth scissor bar, a tenth scissor bar, an eleventh scissor bar, and a twelfth scissor bar;
   wherein each of the plurality of end caps is a strut;
   wherein the plurality of end caps further comprises a first end bar, a second end bar, a third end bar and a fourth end bar;

wherein each of the plurality of dowels is a cylindrical bar;
wherein the plurality of dowels further comprises a first dowel, a second dowel, a third dowel, a fourth dowel, a fifth dowel, a sixth dowel, a seventh dowel, an eighth dowel, a ninth dowel, a tenth dowel, an eleventh dowel, a twelfth dowel, and a thirteenth dowel;
wherein each of the plurality of pivots comprises a drilled hole, a first grommet, and a second grommet;
wherein the plurality of pivots further comprises a first pivot, a second pivot, a third pivot, a fourth pivot, a fifth pivot, a sixth pivot, a seventh pivot, an eighth pivot, a ninth pivot, a tenth pivot, an eleventh pivot, a twelfth pivot, a thirteenth pivot, a fourteenth pivot, a fifteenth pivot, a sixteenth pivot, a seventeenth pivot, an eighteenth pivot, a nineteenth pivot, a twentieth pivot, a twenty first pivot, a twenty second pivot, a twenty third pivot, a twenty fourth pivot, a twenty fifth pivot, a twenty sixth pivot, a twenty seventh pivot, a twenty eighth pivot, a twenty ninth pivot, a thirtieth pivot, a thirty first pivot, a thirty second pivot, a thirty third pivot, a thirty fourth pivot, a thirty fifth pivot, a thirty sixth pivot, a thirty seventh pivot, a thirty eighth pivot, a thirty ninth pivot, a fortieth pivot, a fourth first pivot, a forty second pivot, a forty third pivot, a forty fourth pivot, a forty fifth pivot, a forty sixth pivot, a forty seventh pivot and a forty eighth pivot;
wherein the top structure is assembled from the first end cap, the second end cap, the first dowel, the second dowel, the third dowel, the fourth dowel, the first pivot, the second pivot, the third pivot, the fourth pivot, the fifth pivot, the sixth pivot, the seventh pivot, and the eighth pivot;
wherein the top structure is assembled from the first end cap, the second end cap, the first dowel, the second dowel, the third dowel, the fourth dowel, the first pivot, the second pivot, the third pivot, the fourth pivot, the fifth pivot, the sixth pivot, the seventh pivot, and the eighth pivot;
wherein the bottom structure is assembled from the third end cap, the fourth end cap, the tenth dowel, the eleventh dowel, the twelfth dowel, the thirteenth dowel, the twenty ninth pivot, the thirtieth pivot, the thirty first pivot, the thirty second pivot, the thirty third pivot, the thirty fourth pivot, the thirty fifth pivot and the thirty sixth pivot;
wherein the first scissor structure is assembled from the first scissor bar, the second scissor bar, the third scissor bar, the fourth scissor bar, the fifth dowel, the sixth dowel, the ninth pivot, the tenth pivot, the eleventh pivot, the twelfth pivot, the thirteenth pivot, the fourteenth pivot, the fifteenth pivot and the sixteenth pivot;
wherein the second scissor structure is assembled from the fifth scissor bar, sixth scissor bar, the seventh scissor bar, the eighth scissor bar, the seventh dowel, the eighth dowel, the seventeenth pivot, the eighteenth pivot, the nineteenth pivot, the twentieth pivot, the twenty first pivot, the twenty second pivot, the twenty third pivot, the twenty fourth pivot, the thirty seventh pivot, the thirty eighth pivot, the thirty ninth pivot and the fortieth pivot;
wherein the third scissor structure is assembled from the ninth scissor bar, tenth scissor bar, the eleventh scissor bar, the twelfth scissor bar, the ninth dowel, the twenty fifth pivot, the twenty sixth pivot, the twenty seventh pivot, the twenty eighth pivot, the forty first pivot, the forty second pivot, the forty third pivot, the forty fourth pivot, the forty fifth pivot, the forty sixth pivot, the forty seventh pivot and the forty eighth pivot;
wherein the plurality of clothes hooks comprises a first clothes hook, a second clothes hook, a third clothes hook, and a fourth clothes hook;
wherein the first clothes hook and the second clothes hook are installed in the second end cap;
wherein the third clothes hook and the fourth clothes hook are installed in the first end cap.

2. The garment hanger according to claim 1 wherein
the first scissor structure further comprises a plurality of locking hooks;
wherein the plurality of locking hooks further comprises a first locking hook and a second locking hook;
wherein the first locking hook and the second locking hook are attached to the first scissor structure;
wherein the first locking hook and the second locking hook are used to attach to the fourth dowel to hold the garment hanger in position when the garment hanger is not in the collapsed position.

3. The garment hanger according to claim 2 wherein
the first pivot, the third pivot, the fifth pivot and the seventh pivot are installed in the first end cap;
wherein the second pivot, the fourth pivot, the sixth pivot and the eighth pivot are installed in the second end cap;
wherein the first dowel attaches the first pivot to the second pivot;
wherein the second dowel attaches the third pivot to the fourth pivot;
wherein the third dowel attaches the fifth pivot to the sixth pivot;
wherein the fourth dowel attaches the seventh pivot to the eighth pivot;
wherein the twenty ninth pivot, the thirty first pivot, the thirty third pivot and the thirty fifth pivot are installed in the third end cap;
wherein the thirtieth pivot, the thirty second pivot, the thirty fourth pivot and the thirty sixth pivot are installed in the fourth end cap;
wherein the tenth dowel attaches the twenty ninth pivot and the thirtieth pivot;
wherein the eleventh dowel attaches the thirty first pivot and the thirty second pivot;
wherein the twelfth dowel attaches the thirty third pivot and the thirty fourth pivot;
wherein the thirteenth dowel attaches the thirty fifth pivot and the thirty sixth pivot;
wherein the ninth pivot and the thirteenth pivot are installed in the first scissor bar;
wherein the tenth pivot and the fourteenth pivot are installed in the second scissor bar;
wherein the eleventh pivot and the fifteenth pivot are installed in the third scissor bar;
wherein the twelfth pivot and the sixteenth pivot are installed in the fourth scissor bar;
wherein the fifth dowel attaches the ninth pivot, the tenth pivot, the eleventh pivot, and the twelfth pivot to each other;
wherein the sixth dowel attaches the thirteenth pivot, the fourteenth pivot, the fifteenth pivot, and the sixteenth pivot to each other;
wherein the seventeenth pivot, the twenty first pivot and the thirty seventh pivot are installed in the fifth scissor bar;
wherein the eighteenth pivot, the twenty second pivot and the thirty eighth pivot are installed in the sixth scissor bar;

wherein the nineteenth pivot, the twenty third pivot, and the thirty ninth pivot are installed in the seventh scissor bar;

wherein the twentieth pivot, the twenty fourth pivot, and the fortieth pivot are installed in the eighth scissor bar;

wherein the seventh dowel attaches the seventeenth pivot, eighteenth pivot, nineteenth pivot, and twentieth pivot to each other;

wherein the eighth dowel attaches the twenty first pivot, twenty second pivot, twenty third pivot, and twenty fourth pivot to each other;

wherein the fifth dowel attaches the thirty seventh pivot, thirty eighth pivot, the thirty ninth pivot and fortieth pivot to each other and to the first scissor structure;

wherein the twenty fifth pivot, the forty first pivot and the forty fifth pivot are installed in the ninth scissor bar;

wherein the twenty sixth pivot, the forty second pivot and the forty sixth pivot are installed in the tenth scissor bar;

wherein the twenty seventh pivot, the forty third pivot, and the forty seventh pivot are installed in the eleventh scissor bar;

wherein the twenty eighth pivot, the forty fourth pivot, and the forty eighth pivot are installed in the twelfth scissor bar;

wherein the ninth dowel attaches the twenty fifth pivot, twenty sixth pivot, twenty seventh pivot and the twenty eighth pivot to each other;

wherein the eighth dowel attaches the forty fifth pivot, forty sixth pivot, forty seventh pivot and forty eighth pivot to each other and to the second scissor structure;

wherein the tenth dowel attaches the forty first pivot, forty second pivot, forty third pivot and forty fourth pivot to each other and to the bottom structure.

\* \* \* \* \*